Figure 1:
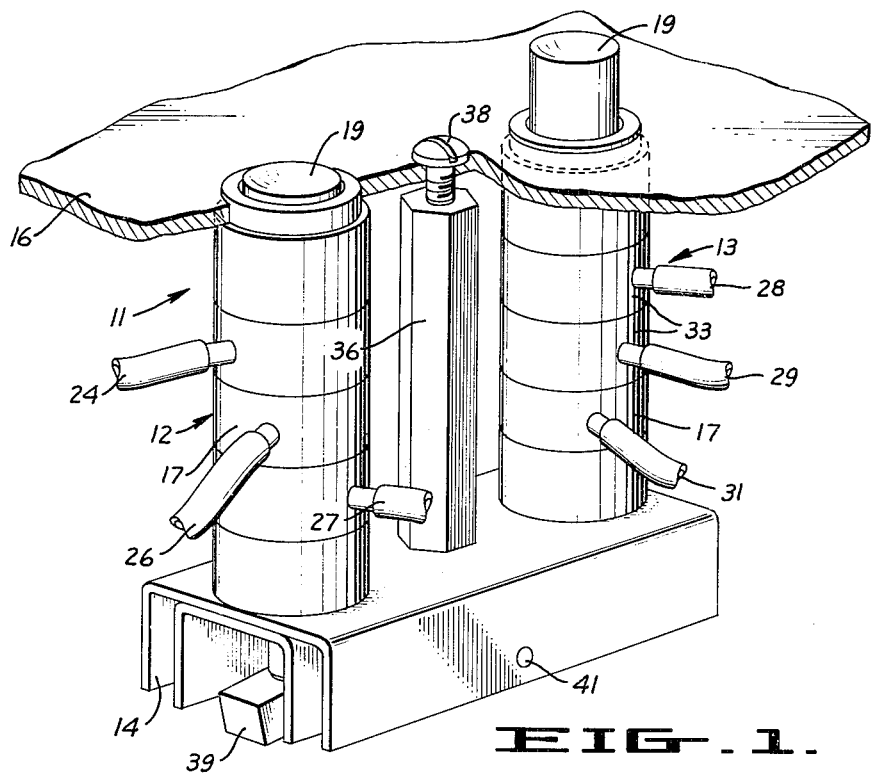

Aug. 10, 1965  E. W. ANTHON  3,199,538
VALVE

Filed March 29, 1962  2 Sheets-Sheet 1

INVENTOR.
ERIK W. ANTHON
BY
Schapp & Hatch
ATTORNEYS

Aug. 10, 1965   E. W. ANTHON   3,199,538
VALVE

Filed March 29, 1962   2 Sheets-Sheet 2

INVENTOR.
ERIK W. ANTHON
BY
*Schapp & Hatch*
ATTORNEYS

United States Patent Office 3,199,538
Patented Aug. 10, 1965

3,199,538
VALVE
Erik W. Anthon, Kensington, Calif., assignor, by mesne assignments, to Warner-Lambert Pharmaceutical Company, Morris Plains, N.J.
Filed Mar. 29, 1962, Ser. No. 183,506
4 Claims. (Cl. 137—625.18)

The present invention relates to improvements in a valve and more particularly to a valve capable of directing fluid flow to or from a given fluid line to one or the other of two other fluid lines.

Certain two-position or two-way valves are now known which are capable of switching fluid flow from a given line to one or another of two other lines. These valves are generally constructed so as to function efficiently where only one such valve is used. However, it is sometimes desirable to use a plurality of two-position valves which may be controlled simultaneously in order to achieve complicated operational changes. It is also desirable to provide valves of this type which are simple in operation and which are easily changed from one position to another.

Such a valve is provided by the present invention which provides a plurality of valve operations under a single control. In addition, the preferred form of valve assembly is versatile in its assembly and may be modified to include more or fewer valve units as desired.

Therefore it is seen that the valve of this invention is particularly suitable for automated systems, including a large variety of such. For example, the valve may be used for controlling the flow of reactants into a reaction chamber and through various possible reaction environments such as are encountered in typical chemical processes. The valve has been designed particularly for use in automated systems for chemical analyses where the handling of fluid samples and fluid reactants must be achieved according to a predetermined set program. Other uses for the valve of this invention will become obvious as the description proceeds. For example, the valve of this invention could even be used for the primary control of hydraulic fluids which themselves serve to provide control of other operations.

Accordingly, it is a primary object of this invention to provide a valve structure suitable for switching fluid communication in fluid lines in which fluid communication may be alternately established between pairs of fluid lines as required.

Another object of the invention is to provide a valve of the character described in which a plurality of valves may be operated under a single control.

A still further object of the invention is the provision of a valve whereby fluid flow may be easily reversed in direction.

Still another object of the invention is the provision of a valve of the character described which is simple in contruction and operation and which is capable of long service with minimal wear on moving parts.

Yet a further object of the invention is to provide a valve of the character described which is capable of easy assembly and disassembly for cleaning, replacement or alteration of parts, reconstruction and modification, and like purposes.

Yet another object of this invention is the provision of a valve composed of standardized units which may be added or removed from the valve to provide as many synchronized valving operations as desired from a single push-pull control.

Yet still another object of the invention is the provision of a valve having a minimum volume which is corrosion and contamination free.

Further objects and advantages of my invention will appear as the specification proceeds, and the new and useful features of my valve will be fully defined in the claims hereto attached.

Figure 2:
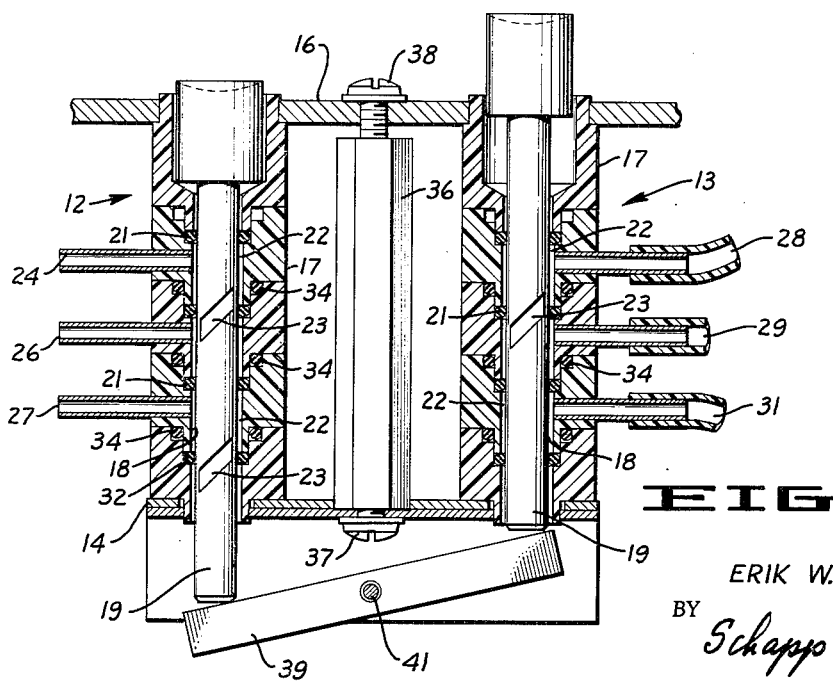
Figure 4:
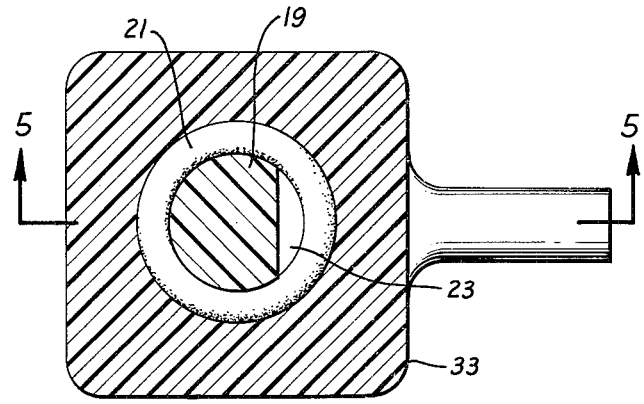
Figure 3:
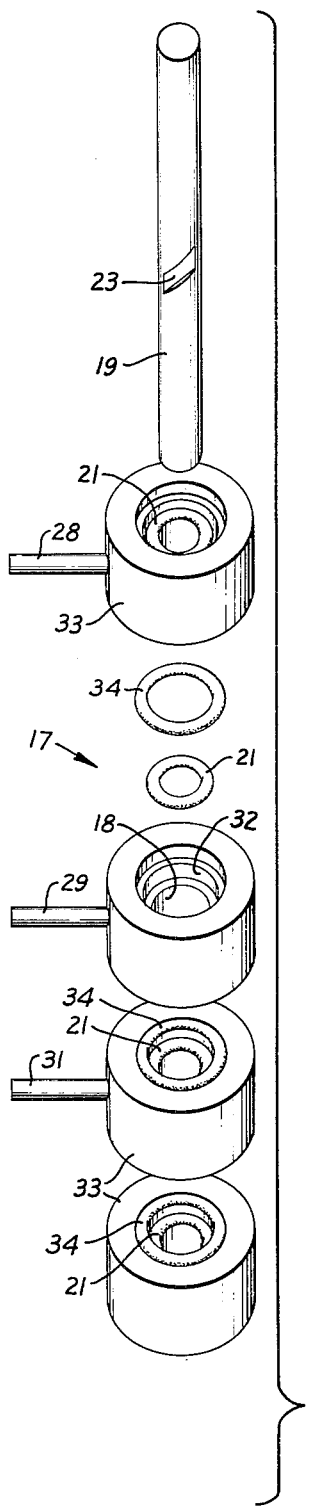
Figure 5:
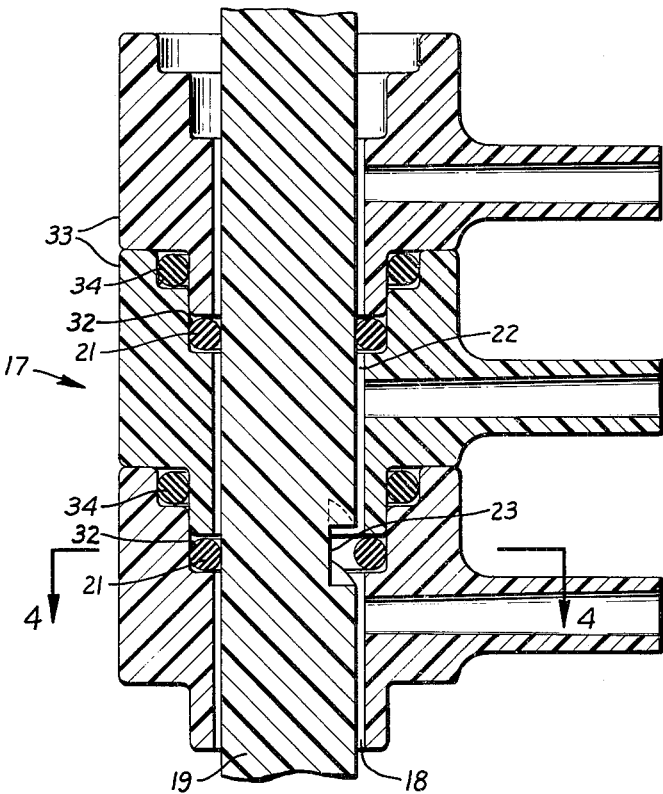

The preferred forms of my invention are illustrated in the accompanying drawing forming part of this invention, in which FIGURE 1 is a perspective view of a valve constructed according to the invention together with a fragmentary view of the valve support means;

FIGURE 2, a vertical cross-sectional view of the valve of FIGURE 1 illustrating in detail the internal parts of the valve structure;

FIGURE 3, an exploded perspective view of certain of the parts utilized in the construction of the valve of FIGURES 1 and 2 showing the manner in which they are assembled;

FIGURE 4, an enlarged cross-sectional view of a modified form af valve structure that may be used in this invention as seen from the plane of line 4—4 of FIGURE 5; and FIGURE 5 a fragmentary vertical sectional view of the valve unit shown in FIGURE 4, taken substantially in the plane of line 5—5 thereof.

While I have shown only the preferred form of my invention, it should be understood that various changes or modifications may be made within the scope of the claims hereto attached without departing from the spirit of the invention.

Referring to the drawing in greater detail, there is shown in FIGURES 1 and 2 a valve apparatus 11 containing valves 12 and 13 mounted on a pair of channel members 14 in a support housing 16. Each of the valves 12 and 13 comprises a valve housing 17 enclosing an elongated chamber 18, a rod 19 mounted for axial movement within the housing, a plurality of sealing units 21 carried in the housing and adapted to fit around the perimeter of the rod and divide the elongated chamber into a plurality of compartments 22.

As best seen in FIGURE 2, it is seen that the rod 19 is of a size somewhat smaller than the chamber 18 of the housing so as to define a space between the outer surface of the rod and the inner surface of the housing. In order to provide communication between adjacent compartments when desired, a recess 23 is provided in each of the desired positions so as to provide fluid communication past any one of said sealing units when in juxtaposed position thereto. In order to effect outside communication with each of the compartments 22, there are walls in the housing defining passages between the compartments and the outside. Specifically, these passages are contained in the ducts 24, 26 and 27 of the valve 12 and ducts 28, 29 and 31 of valve 13.

As here shown, the elongated chamber 18 of housing 17 is generally cylindrical with the housing having a substantially uniform circular cross-section on the inner surface thereof. Similarly, the rod 19 mounted in the housing is of a size somewhat smaller than the chamber of the housing and is also of a substantially uniform circular cross-section so that an annular space is defined between the outer surface of the rod and the inner surface of the housing. It is this annular space that is divided into the compartments 22 by the sealing units 21. Preferably the sealing units are in the shape of O-rings and each is carried in a circular groove 32 formed within the housing on the inner surface thereof.

Thus it is seen from FIGURE 2 that the O-rings normally seal against the rod 19 so as to prevent fluid communication between adjacent compartments. However, when the recess 23 is positioned at an O-ring, fluid communication is established through the recess 23, past the O-ring, and fluid can then pass between adjacent compartments.

As best seen in FIGURE 3, the valve housing 17 is composed of a plurality of individual units 33 adapted to fit in partial telescoping relation within each other. In this way the housing is easily assembled and the sealing units or O-rings 21 are easily snapped into place. Additional O-rings 34 are provided between adjacent units 33 in order to provide a hermetic seal and prevent leakage.

In assembling the valve housing 17, the appropriate O-rings are fit into place in each unit and the desired number of units are stacked together. Rod 19 is also slipped into place, and the valve housing is fastened between channel members 14 and housing shell 16 as best shown in FIGURES 1 and 2.

In a typical installation, a post 36 is provided on channel members 14 and held thereon by screw 37 or other suitable means. Screw 38 is then fastened through a cover plate or top of the housing 16 so as to force the same down against the upper end of valve housing 17 and retain the assembly thereof.

From the foregoing description, it is apparent that the valve may be constructed to contain as many chambers as desired, and that all control of fluid communication between the chambers is effected by movement of the rod 19 carrying the appropriate recesses 23. Accordingly, the rod 19 is axially movable a distance of at least the length of one of the compartments and preferably a distance substantially equal to the length of each of the compartments. In this way, movement of the rod between its terminal positions will change communication from a given compartment to the next compartment above or below. If desired, movement of the rod to a neutral position will shut off operation of the valve entirely.

As shown in FIGURES 1 and 2, the number of simultaneously operating valve compartments may be increased by providing additional valve assemblies 12 and 13 as well as by increasing the number of units 33 in each assembly. In this structure, the movement of rod 19 of valve 12 downwardly pushes against a lever 39 which is pivotally fastened in channel members 14 through pin 41. As the rod 19 of valve 12 pushes lever 39 down at one end, the other end pivots upwardly and raises rod 19 of valve 13.

In reverse order, pushing down of the rod of valve 13 actuates the rod of valve 12. In this way the two valves are operated simultaneously as a single apparatus. In the valve assembly shown, operation of the valve may be achieved by hand, but more often, motion will be provided by a motor or other mechanical device (not shown) in order to provide automatic control.

In general, any suitable material may be used for making the various parts of the valve assembly of this invention, and specific materials may be selected for specific uses. Certain plastics have been found to be satisfactory and have the advantages of simple fabrication and good physical and chemical properties. For example, nylon and polyethylene have been used for making the valve housing.

Similarly a variety of compositions are suitable for fabricating the O-rings. For example, rubber compositions are suitable for many applications, including natural rubbers, synthetic rubbers and specialty rubbers such as silicone rubbers. Neoprene is especially satisfactory. These materials are particularly suitable where the valve is used to direct streams of compressed air or carry air or other gases under reduced pressure. On the other hand, materials which are chemically resistant should be used where the valve is handling liquids, which might otherwise damage the O-ring. A particularly suitable material is an elastomer sold under the trade name of Viton.

The rod may also be made from any of a number of suitable materials. However, plastics having the properties of self-lubrication are particularly valuable. Accordingly plastics such as Teflon (polytetrafluoroethylene) are especially useful. Other suitable plastics include materials similar to Teflon such as polychlorotrifluoroethylene.

The self-lubricating property of the rod is important in order to ensure smooth operation of the rod as it is moved axially through the housing in contact with the sealing units or O-rings 21. In order to avoid undue friction and to provide the longest possible wearing qualities, it is also important to provide the recesses 23 substantially as shown in the drawings. In other words, better wearing qualities are obtained when the recesses are formed in the surface of the rod by means of cuts extending at an acute angle to the plane perpendicular to the axis of the rod. With such a structure the edges of the recess contact progressively different portions of the O-rings 21 and reduce wear to a minimum.

In general, the housing 17 may have any desired external form. It may be of a circular cross-section as shown in the embodiments of FIGURES 1 through 3 or it may be of a square cross-section as shown in FIGURES 4 and 5. Obviously, other shapes could be used if desired. However, as shown in FIGURES 4 and 5 the rod 19 preferably has a substantially uniform circular cross-section except where the recess 23 is formed therein. Except for the external shape of the housing and the integral ducts which are molded as part of the unit, the embodiment of FIGURES 4 and 5 is similar to that of FIGURES 1 through 3. Thus FIGURE 5 shows in greater detail the construction of the internal parts of the valve units and better illustrates the manner in which communication is effected between adjacent compartments 22 through recesses 23 of rod 19.

The operation of the valve here shown may be seen with reference to FIGURE 2 in which valve 12 is used for connecting duct 26 to a source of air under pressure or to a vacuum, and valve unit 13 is used to change liquid communication from between line 28 and 29 to communication between line 29 and 31 and back.

Referring to FIGURE 2, the operation may be illustrated by considering an air compressor (not shown) connected with its suction side in communication with duct 27 and its compression side in communication with duct 24. In the position shown, air is brought into the compressor through duct 27 from the associated compartment 22 and the recess 23 which is in communication with the outside at the lower end of the valve. Air on the compression side of the compressor enters the valve through duct 24 into its associated chamber and down through the upper recess 23 into the chamber in communication with duct 26. In this way compressed air is delivered to duct 26.

On reversal of the valve, i.e., a movement of valve rod 19 upwardly a distance equivalent to the length of the compartment 22, the recesses 23 are in a different position and the operation is now as follows:

The suction side of the compressor is still in communication with duct 27, but now this duct and its associated chamber are in communication with the chamber communicating with duct 26. Thus, air is drawn through duct 26 in a reverse direction. Duct 24, which is on the compression side of the compressor, delivers air to its associated chamber and through the upper recess 23 to exhaust at the top of valve 12. Obviously other operations may be achieved if desired and more valve units could be included.

At the same time valve 12 is operating, valve 13 is also operating so as to change fluid communication in the ducts shown. In other words, with the valve 13 in the position shown, liquid is free to flow between ducts 28 and 29 because the associated chambers thereof are in communication through recess 23. On the other hand, duct 31 is effectively shut off, since there is no communication with its associated compartment 22.

When the valve rod 19 of valve 13 is depressed, duct 28 then becomes shut off and ducts 29 and 31 are in communication for free fluid flow therebetween.

The valve assemblies shown are thus particularly useful for switching and handling of fluids such as may be encountered in certain automated fluid systems. I have found the valve apparatus to be particularly suitable for fluid handling in automated analytical equipment. In such systems, the versatility of the valve and the possibility of using many valve units in a variety of different ways is particularly valuable. Obviously other uses where valves of this nature may be employed are within the scope of the invention.

From the foregoing description it is seen that I have provided a valve system capable of providing a plurality of valve operations under a single control which is particularly useful for fluid handling in automated systems. It is also seen that my valve is simple in construction and operation as well as being suitable for a wide variety of different valving operations.

I claim:

1. A valve comprising a housing enclosing an elongated chamber having a substantially uniform cross-section, a rod having a substantially uniform cross-section mounted for axial movement within said housing, said rod being of a size somewhat smaller than the chamber of the housing to define a space between the outer surface of the rod and the inner surface of the housing, a plurality of sealing units carried in said housing adapted to fit around the perimeter of said rod and divide the space between the rod and the housing into a plurality of compartments, and a recess in the rod adapted to provide communication past any one of said sealing units when in juxtaposed position thereto to provide communication between two adjacent compartments, said recess being formed in the surface of the rod by a cut extending at an acute angle to a plane perpendicular to the axis of the rod.

2. A valve unit containing a plurality of valves operatively connected for simultaneous operation, each of said valves comprising a housing enclosing an elongated chamber having a substantially uniform circular cross-section, a self-lubricating plastic rod mounted in said housing for axial movement therein with the portion of the rod within the chamber of the housing having a substantially uniform circular cross-section, said rod being of a size somewhat smaller than the chamber of the housing to define an annular space between the outer surface of the rod and the inner surface of the housing, a plurality of sealing units carried in said housing adapted to fit around the perimeter of said rod and divide the space between the rod and the housing into a plurality of compartments, and a single recess in the rod in the form of a cut adapted to provide communication past any one of said sealing units when in juxtaposed position thereto, said valve also containing lever means for moving the rods of all valves simultaneously to provide a plurality of changes of fluid communications through a common actuating element.

3. A valve unit containing a plurality of valves operatively connected for simultaneous operation, each of said valves comprising a housing enclosing an elongated chamber having a substantially uniform circular cross-section, a rod mounted in said housing for axial movement therein with the portion of the rod within the chamber of the housing having a substantially uniform circular cross-section, said rod being of a size somewhat smaller than the chamber of the housing to define an annular space between the outer surface of the rod and the inner surface of the housing, a plurality of sealing units in the form of O-rings carried in circular grooves within said housing adapted to fit around the perimeter of the rod and divide the annular space between the rod and the housing into a plurality of compartments, a recess in the rod adapted to provide communication past any one of said sealing units when in juxtaposed position thereto to provide communication between two adjacent compartments, said recess being formed in the surface of the rod by a cut extending at an acute angle to a plane perpendicular to the axis of the rod, and means for moving said rod axially with respect to said housing, said means operatively connected to the rods of all valves to effect simultaneous operation of all the valves in the valve unit.

4. A valve comprising a housing enclosing an elongated chamber having a substantially uniform circular cross-section, a rod mounted in said housing for axial movement therein with the portion of the rod within the chamber of the housing having a substantially uniform circular cross-section, said rod being of a size somewhat smaller than the chamber of the housing to define an annular space between the outer surface of the rod and the inner surface of the housing, a plurality of sealing units in the form of O-rings carried in circular grooves within said housing adapted to fit around the perimeter of the rod and divide the annular space between the rod and the housing into a plurality of compartments, a plurality of recesses at axially-spaced locations in the rod, each of said recesses adapted to provide communication past any one of said sealing units when in juxtaposed position thereto to provide communication between two adjacent compartments, said recesses being formed in the surface of the rod by a cut extending at an acute angle to a plane perpendicular to the axis of the rod, walls defining passages through said housing for carrying fluids to and from the compartments, and means for moving said rod axially with respect to said housing a distance of at least the length of a compartment whereby said recesses are movable from an operative position against one group of said sealing units to an operative position against another group of said sealing units.

References Cited by the Examiner

UNITED STATES PATENTS

| | | | |
|---|---|---|---|
| 2,713,989 | 7/55 | Bryant | 137—625.4 XR |
| 2,747,611 | 5/56 | Hewitt | 251—367 XR |
| 2,764,181 | 9/56 | Richolt | 137—625.4 XR |
| 2,822,824 | 2/58 | Glower et al. | 137—625.42 |
| 2,834,368 | 5/58 | Gray | 251—367 XR |
| 2,887,127 | 5/59 | Broadbent | 251—367 XR |
| 2,910,081 | 10/59 | Karbowniczek | 251—324 XR |
| 2,923,311 | 2/60 | Jeffrey | 137—559 XR |
| 2,946,485 | 7/60 | Durner | 251—324 XR |
| 3,092,141 | 6/63 | Stark | 137—608 |
| 3,135,292 | 6/64 | Roberts | 251—324 XR |

FOREIGN PATENTS

| | | |
|---|---|---|
| 1,211,468 | 10/59 | France. |
| 1,218,111 | 12/59 | France. |
| 749,280 | 5/56 | Great Britain. |

LAVERNE D. GEIGER, *Primary Examiner.*

ISADOR WEIL, *Examiner.*